US010776397B2

(12) United States Patent
Kalki et al.

(10) Patent No.: US 10,776,397 B2
(45) Date of Patent: Sep. 15, 2020

(54) DATA INTEREST ESTIMATION FOR N-DIMENSIONAL CUBE COMPUTATIONS

(71) Applicant: Amazon Technologies, Inc., Seattle, WA (US)

(72) Inventors: Santosh Kalki, Seattle, WA (US); Srinivasan Sundar Raghavan, Mercer Island, WA (US); Timothy Andrew Rath, Des Moines, WA (US); Mukul Vijay Karnik, Redmond, WA (US); Amol Devgan, Seattle, WA (US); Swaminathan Sivasubramanian, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/494,524

(22) Filed: Sep. 23, 2014

(65) Prior Publication Data
US 2015/0370883 A1 Dec. 24, 2015

Related U.S. Application Data

(60) Provisional application No. 62/015,312, filed on Jun. 20, 2014.

(51) Int. Cl.
*G06F 16/28* (2019.01)
*H04L 29/06* (2006.01)
(Continued)

(52) U.S. Cl.
CPC .......... *G06F 16/283* (2019.01); *G06F 16/185* (2019.01); *G06F 16/24* (2019.01);
(Continued)

(58) Field of Classification Search
CPC ......... G06F 17/30592; G06F 17/30221; G06F 17/30386; G06F 17/30572; G06F 16/283;
(Continued)

(56) References Cited

U.S. PATENT DOCUMENTS 5,987,467 A * 11/1999 Ross ................ G06F 17/30592
6,137,493 A * 10/2000 Kamimura ........ G06F 17/30333
345/423
(Continued)

FOREIGN PATENT DOCUMENTS

| CN | 103281376 A | 9/2013 |
| CN | 103793422 A | 5/2014 |

(Continued)

OTHER PUBLICATIONS

Authors et. al.: IBM, IP.com No. IPCOM000153013D—A Method for Incrementally Updating a Multi-dimensional Data Cache, May 21, 2007.*
(Continued)

*Primary Examiner* — Mark D Featherstone
*Assistant Examiner* — Faezeh Forouharnejad
(74) *Attorney, Agent, or Firm* — Davis Wright Tremaine LLP

(57) ABSTRACT

An online analytical processing system may comprise an n-dimensional cube partitioned into slices, in which each slice may represent data points at the intersections of fixed and variable dimensions. Computation of data points within a slice may be deferred. A dependency graph may be initially constructed, in which the dependency graph is utilized in a subsequent computation. Calculation of data points may be prioritized based on information indicative of a chance that the data points will be accessed.

21 Claims, 12 Drawing Sheets

(51) Int. Cl.
*G06F 16/24* (2019.01)
*G06F 16/26* (2019.01)
*G06F 16/185* (2019.01)
*G06F 16/27* (2019.01)
*G06F 16/901* (2019.01)
*G06F 21/62* (2013.01)

(52) U.S. Cl.
CPC ........... *G06F 16/26* (2019.01); *G06F 16/278* (2019.01); *G06F 16/282* (2019.01); *G06F 16/9027* (2019.01); *G06F 21/6236* (2013.01); *H04L 63/10* (2013.01)

(58) Field of Classification Search
CPC ...... G06F 16/26; G06F 16/282; G06F 16/278; G06F 16/9027; G06F 16/24; G06F 16/185; G06F 21/6236; H04L 63/10
See application file for complete search history.

(56) References Cited

U.S. PATENT DOCUMENTS

| | | |
|---|---|---|
| 6,424,967 B1 | 7/2002 | Johnson et al. |
| 6,456,997 B1* | 9/2002 | Shukla ............... G06Q 10/06 |
| 6,493,718 B1* | 12/2002 | Petculescu .......... G06F 17/3048 |
| | | 707/600 |
| 6,535,872 B1* | 3/2003 | Castelli ............. G06F 17/30554 |
| 6,609,123 B1* | 8/2003 | Cazemier .......... G06F 17/30607 |
| 6,684,216 B1* | 1/2004 | Duliba ............. G06F 17/30595 |
| | | 707/694 |
| 6,691,140 B1* | 2/2004 | Bogrett ............. G06F 17/30592 |
| 6,707,454 B1* | 3/2004 | Barg ..................... G06F 17/246 |
| | | 345/440 |
| 7,272,613 B2 | 9/2007 | Sim et al. |
| 7,284,011 B1 | 10/2007 | Narayanaswamy et al. |
| 7,366,730 B2 | 4/2008 | Greenfield et al. |
| 7,761,407 B1 | 7/2010 | Stern |
| 7,954,090 B1 | 5/2011 | Qureshi et al. |
| 8,166,042 B1 | 4/2012 | Praun et al. |
| 8,245,290 B2 | 8/2012 | Hosoda |
| 8,280,853 B1 | 10/2012 | Lai et al. |
| 8,341,111 B2 | 12/2012 | Patil et al. |
| 8,346,711 B2 | 1/2013 | Al-Duwaish et al. |
| 8,417,723 B1 | 4/2013 | Lissack et al. |
| 8,447,722 B1 | 5/2013 | Ahuja et al. |
| 8,566,749 B2 | 10/2013 | Kashik et al. |
| 8,683,468 B2* | 3/2014 | Breternitz ..................... 718/100 |
| 8,732,118 B1 | 5/2014 | Cole et al. |
| 9,229,997 B1 | 1/2016 | Raghavan et al. |
| 9,286,391 B1 | 3/2016 | Dykstra et al. |
| 9,535,970 B2* | 1/2017 | Mohan ................. G06F 16/283 |
| 9,824,133 B1 | 11/2017 | Kalki et al. |
| 9,882,949 B1 | 1/2018 | Kalki et al. |
| 2002/0194163 A1 | 12/2002 | Hopeman et al. |
| 2003/0088447 A1* | 5/2003 | Desbiens .............. G06Q 10/06 |
| | | 707/802 |
| 2003/0115194 A1* | 6/2003 | Pitts .................. G06F 17/30448 |
| 2004/0034666 A1* | 2/2004 | Chen ................. G06F 17/30241 |
| 2004/0138932 A1 | 7/2004 | Johnson et al. |
| 2004/0162852 A1 | 8/2004 | Qu et al. |
| 2004/0215626 A1* | 10/2004 | Colossi ............. G06F 17/30312 |
| 2004/0236767 A1 | 11/2004 | Soylemez et al. |
| 2004/0243593 A1 | 12/2004 | Stolte et al. |
| 2005/0055289 A1 | 3/2005 | Mehldahl |
| 2005/0065910 A1 | 3/2005 | Welton et al. |
| 2005/0120018 A1 | 6/2005 | Whitney |
| 2005/0131924 A1 | 6/2005 | Jones |
| 2005/0210052 A1 | 9/2005 | Aldridge |
| 2006/0053136 A1* | 3/2006 | Ashiri ............... G06F 17/30539 |
| 2006/0085444 A1 | 4/2006 | Sarawgi et al. |
| 2006/0112976 A1 | 6/2006 | Reiche et al. |
| 2006/0122877 A1* | 6/2006 | Yazdani ................. G06Q 10/06 |
| | | 705/28 |
| 2006/0200448 A1 | 9/2006 | Edmunds et al. |
| 2006/0288046 A1* | 12/2006 | Gupta ............... G06F 17/30592 |
| 2007/0022120 A1 | 1/2007 | Huang et al. |
| 2008/0201358 A1 | 8/2008 | Calusinski |
| 2008/0288524 A1* | 11/2008 | Dumitru .......... G06F 17/30312 |
| 2009/0006788 A1 | 1/2009 | Hunt et al. |
| 2009/0063752 A1 | 3/2009 | Dow |
| 2009/0144213 A1 | 6/2009 | Patil et al. |
| 2009/0249125 A1 | 10/2009 | Bhatawdekar et al. |
| 2009/0254583 A1* | 10/2009 | Kenney ................. G06F 16/283 |
| 2009/0262131 A1 | 10/2009 | Suntinger et al. |
| 2009/0282369 A1 | 11/2009 | Jones |
| 2009/0287666 A1 | 11/2009 | DeKimpe et al. |
| 2009/0327330 A1 | 12/2009 | Abouzied et al. |
| 2010/0057700 A1 | 3/2010 | Williamson |
| 2010/0153064 A1* | 6/2010 | Cormode ................. G06F 17/18 |
| | | 702/179 |
| 2010/0153341 A1 | 6/2010 | Driesen et al. |
| 2010/0287146 A1* | 11/2010 | Skelton .................. G06Q 10/06 |
| | | 707/705 |
| 2011/0161379 A1 | 6/2011 | Grund et al. |
| 2011/0213751 A1 | 9/2011 | Iorio et al. |
| 2011/0261049 A1* | 10/2011 | Cardno .................. G06Q 10/10 |
| | | 345/419 |
| 2011/0261202 A1 | 10/2011 | Goldstein |
| 2011/0314523 A1 | 12/2011 | Blumenfeld et al. |
| 2011/0320398 A1* | 12/2011 | Abdellatif Abouzeid ................... |
| | | G06F 17/30442 |
| | | 707/600 |
| 2012/0239596 A1 | 9/2012 | Lee et al. |
| 2012/0316916 A1 | 12/2012 | Andrews et al. |
| 2013/0125057 A1* | 5/2013 | Kashik ............. G06F 17/30994 |
| | | 715/852 |
| 2013/0254838 A1 | 9/2013 | Ahuja et al. |
| 2013/0304714 A1 | 11/2013 | Lee et al. |
| 2013/0339291 A1 | 12/2013 | Hasner |
| 2014/0101093 A1* | 4/2014 | Lanphear .......... G06F 17/30563 |
| | | 707/602 |
| 2014/0279839 A1* | 9/2014 | Balzar ..................... G06F 9/466 |
| | | 707/607 |
| 2014/0297652 A1 | 10/2014 | Stevens et al. |
| 2015/0134626 A1 | 5/2015 | Theimer et al. |
| 2015/0134797 A1 | 5/2015 | Theimer et al. |
| 2015/0310082 A1 | 10/2015 | Han et al. |
| 2015/0370883 A1 | 12/2015 | Kalki et al. |
| 2017/0116552 A1 | 4/2017 | Deodhar et al. |

FOREIGN PATENT DOCUMENTS

| | | | |
|---|---|---|---|
| JP | 09-265479 A | 10/1997 | |
| JP | 2002-108896 A | 4/2002 | |
| JP | 2003006194 A | 1/2003 | |
| JP | 2009-512909 A | 3/2009 | |
| JP | 2013520738 A | 6/2013 | |
| JP | 2014002792 A | 1/2014 | |
| WO | WO 2005111611 A2 * | 11/2005 | ........ G06F 17/30592 |

OTHER PUBLICATIONS

Authors et. al.: IBM , IP.com No. IPCOM000186229D—Dynamic, interactive creation of OLAP dimensions , Aug. 13, 2009.*
Frank Dehne and Hamidreza Zaboli, "Parallel Real-Time OLAP on Multi-Core Processors", 2012, 12th IEEE/ACM International Symposium on Cluster, Cloud and Grid Computing (Year: 2012).*
International Patent Application No. PCT/US2015/036834; Int'l Preliminary Report on Patentability; dated Dec. 29, 2016; 13 pages.
Dehne et al.; "Parallel Real-Time Olap on Multi-Core Processors"; Cluster, Cloud and Grid Computing; 12 IEEE/ACM Int'l Symposium; 2012; 23 pages.
Zhou; "Parallel Real-Time Olap on Cloud Platforms"; School of Computer Science at Carleton University; Thesis; Nov. 2013; 110 pages.
Goil et al.; "A Parallel Scalable Infrastructure for Olap and Data Mining"; Database Engineering and Applications; IEEE Int'l Symposium Proceedings; 1999; 9 pages.
Aguilera et al.; "A Practical Scalable Distributed B-Tree"; Proceedings of the VLCB Endowment; Aug. 2008 vol. 1 No. 1; p. 598-609.

(56) References Cited

OTHER PUBLICATIONS

Sowell et al.; "Minuet: A Scalable Distributed Multiversion B-Tree"; Proceedings of the VLDB Endowment; May 2012; vol. 5 Issue 9; p. 884-895.
Du Mouza et al.; "SD-Rtree: A Scalable Distibuted Rtree"; Data Engineering; IEEE 23$^{rd}$ Int'l Conference; Apr. 2007; 19 pages.
International Patent Application No. PCT/US2015/036834; Int'l Search Report and the Written Opinion; dated Sep. 23, 2015; 18 pages.
Singapore Patent Application No. 11201610603T; Written Opinion; dated Aug. 27, 2017; 6 pages.
Australian Notice of Acceptance for Patent Application dated Aug. 23, 2018, Patent Application No. 2015276830, Filed Jun. 19, 2015, 3 pages.
Canadian Notice of Allowance dated Oct. 3, 2018, Patent Application No. 2,952,882, filed Jun. 19, 2015, 1 page.
Canadian Office Action dated Aug. 14, 2018, Patent Application No. 2,952,877, filed Jun. 19, 2015, 5 page.
European Communication pursuant to Article 94(3) EPC dated Jun. 1, 2018, Patent Application No. 15733982.1, filed Jun. 19, 2015, 5 pages.
Japanese Decision to Grant dated Sep. 3, 2018, Patent Application No. 2017-519468, filed Jun. 19, 2015, 2 pages.
Korean Office Action dated Jul. 9, 2018, Patent Application No. 10-2017-7001694, filed Jun. 19, 2015, 4 pages.
Singaporean Notice of Eligibility for Grant dated Jul. 10, 2018, Patent Application No. 11201610603T, filed Jun. 19, 2015, 5 pages.
European Notice of Allowance dated Dec. 13, 2018, Patent Application No. 15733982.1, filed Jun. 19, 2015, 56 pages.
Canadian Notice of Re-Allowance dated May 1, 2019, Patent Application No. 2,952,882, filed Jun. 19, 2015, 1 page.
Canadian Office Action dated Jul. 12, 2019, Patent Application No. 2,952,877, filed , 5 pages.
Chinese First Office Action dated Jul. 1, 2019, Patent Application No. 201580032274.1, filed Jun. 19, 2015, 4 pages.
Korean Decision of Patent Grant dated Apr. 30, 2019, Patent Application No. 10-2017-7001694, filed Jun. 19, 2015, 2 pages.
Eltabakh, "OLAP & Data Mining," Worcester Polytechnic Institute (WPI), Apr. 2012, http://web.cs.wpi.edu/~cs561/s12/Lectures/IntegrationOLAP/OLAPandMining.pdf, 38 pages.
International Preliminary Report on Patentability dated Dec. 29, 2016, International Patent Application No. PCT/US2015/036835, filed Jun. 19, 2015, 10 pages.
International Search Report and Written Opinion dated Oct. 23, 2015, International Patent Application No. PCT/US2015/036835, filed Jun. 19, 2015, 12 pages.
Chinese Notice of Allowance dated Dec. 31, 2019, Patent Application No. 201580032274.1, filed Jun. 19, 2015, 4 pages.

* cited by examiner

DATA INTEREST ESTIMATION FOR N-DIMENSIONAL CUBE COMPUTATIONS

CROSS-REFERENCES TO RELATED APPLICATIONS

This application claims benefit under 35 U.S.C. § 119(e) of U.S. Provisional Patent Application No. 62/015,312, filed Jun. 20, 2014, the contents of which are hereby incorporated by reference in its entirety.

This application is also related to application entitled "EMBEDDABLE CLOUD ANALYTICS," U.S. Provisional Patent Application No. 62/015,302, filed on Jun. 20, 2014, as well as application entitled "AUTOMATED HIERARCHY DETECTION FOR CLOUD-BASED ANALYTICS," U.S. Provisional Patent Application No. 62/015,308, filed on Jun. 20, 2014, as well as application entitled "REAL-TIME HOSTED SYSTEM ANALYTICS," U.S. Provisional Patent Application No. 62/015,294, filed on Jun. 20, 2014, and application entitled "CLOUD ANALYTICS MARKETPLACE," U.S. Provisional Patent Application No. 62/015,307, filed on Jun. 20, 2014, which are hereby incorporated by reference in their entireties.

BACKGROUND

Data warehouse and online analytical processing ("OLAP") systems may be used to perform various functions related to data mining, reporting, and forecasting. OLAP systems may permit multidimensional analysis of data typically obtained from transactional systems, such as relational databases, and loaded into a multidimensional cube structure. Data points, such as various aggregate values, may be calculated within the n-dimensional cube structure at each intersection of the various dimensions it contains. Accordingly, the process of populating a multidimensional cube structure may involve significant amounts of computation. In addition, the n-dimensional cube may be updated on a periodic basis to incorporate new data. Updating the n-dimensional cube may involve recomputing the data points at each intersection of its dimensions. The recomputation may be even more burdensome when new dimensions are to be added to the n-dimensional cube. Accordingly, these types of n-dimensional cube structures are not well suited to dynamic data environments.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed to maintain an n-dimensional cube using a structure that is suitable for dynamic data environments, including hosted analytics platforms. Embodiments may be employed to provide analytics in conjunction with streams of data that may introduce new attributes, dimensions, or hierarchies, which may be helpful for analytics if included in an n-dimensional cube. Embodiments may employ an n-dimensional cube structured using a slice-based partitioning scheme. Each slice may comprise data points that correspond to a set of dimension values fixed across the slice and a set of dimension values allowed to vary. Attributes, dimensions, or hierarchies may be added to an n-dimensional cube by the addition of a new slice or modification of an existing slice. Views of the n-dimensional cube may be partially precomputed by forming dependency links between slices, slice regions, and individual data points. The approach described herein may be employed to enable n-dimensional cube structures that can be expanded or contracted with respect to additional dimensions and attributes without requiring full recalculation or recomputation of large extents of the n-dimensional cube.

Figure 1A:
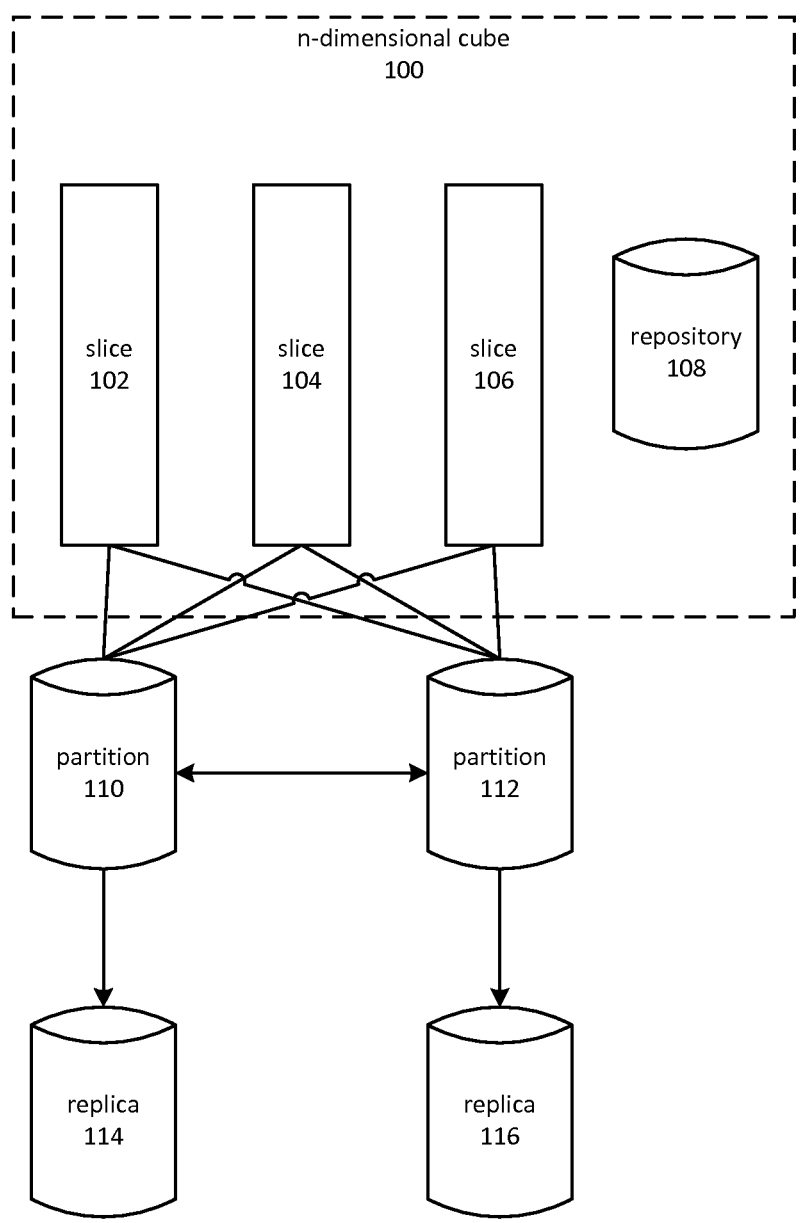
FIG. 1A is a block diagram depicting an embodiments of a system for maintaining an n-dimensional cube usable in connection with cloud-based analytics.

FIG. 1A is a block diagram depicting an embodiment of a system for maintaining an n-dimensional cube 100 usable in connection with cloud-based analytics. Users of a cloud-based analytics system may view analytical data as a multidimensional array containing aggregated data and relevant attributes at the intersection points. The multidimensional array may be sparse, meaning that a relatively small number of intersection points are, in such cases, associated with data.

A cloud-based analytics system may include n-dimensional cube 100 which, although it may be seen conceptually by its users as a multidimensional array, can comprise a plurality of slices 102-106 and repository 108. A slice 102 may comprise a set of aggregated data and attributes sets for a one-dimensional list of array intersections fixed to the remaining dimensions of the n-dimensional cube. In various embodiments, multidimensional "slices" may be employed, which is to say that a slice may also comprise a multidimensional structure fixed to the remaining dimensions of the n-dimensional cube.

A repository 108 may comprise a data repository, such as a relational or non-relational database, that maintains a collection of information concerning slices 102-106. Non-limiting examples of data that may be maintained in repository 108 include slice identifiers, identifiers of fixed dimensions, identifiers of variable dimensions, dependency information, refresh or staleness data, and so forth.

Slices 102-106 may be maintained on one or more partitions, such as partitions 110 and 112. A partition may comprise a server or other computing node hosting a database management system or other mechanism for maintaining the constituent data of one or more of the slices 102-106. Various partitioning schemes may be employed to divide workload and storage requirements between partitions 110 and 112.

Embodiments may also perform replication of partitions 110 and 112 to replicas 114 and 116. Embodiments may use replication to improve the reliability and performance of a cloud-based analytics system employing n-dimensional cube 100. Portions of an n-dimensional cube, such as a slice, hierarchy, or region of a hierarchy, may be partitioned or replicated in order to accommodate computational demands associated with maintaining data points in an n-dimensional cube. For example, a portion of an n-dimensional cube subject to high read activity might be scaled-out to include a computing node hosting a writable partition and a number of additional computing nodes hosting read-only partitions. A portion of an n-dimensional cube associated with high write activity might be further divided into sub-portions and partitioned between a number of computing nodes.

In an embodiment, data may be allocated between nodes based on access patterns. Allocation may involve identifying and implementing a partitioning scheme, enabling replication if called for, configuring load balancing mechanisms, and so on. The partitioning and replication may, as described herein, occur at various levels such as by slice, by hierarchy, by region of hierarchy, and so on. The access patterns may involve trends and patterns of queries performed by the n-dimensional cube or on a particular slice. Various statistics and other metrics concerning access patterns can be collected and used for allocation. These include metrics recording the frequency and proportion of update operations, the frequency and proportion of operations requiring calculation, the frequency and proportion of operations involving data movement, and so on.

In an embodiment, computational demands related to a slice portion may be compared to performance characteristics of partition hosts, and data allocated between the partition hosts accordingly. For example, slices participating in a high degree of data movement may be collocated on the same computing node, placed on computing nodes connected to the same branch of a network, or placed on computing nodes connected by a higher-speed network. Another example involves allocating data that involves a high degree of computations on computing nodes whose performance characteristics include optimized amounts of CPU power and/or memory.

In an embodiment, data may be allocated between nodes based on security considerations. It may be the case that certain dimensions or levels of a hierarchy are used for computations but are not viewable to users of the n-dimensional cube. Data may be allocated between computing nodes based on security attributes associated with each computing node. For example, a computing node might be configured to process requests originated by computing nodes hosting portions of an n-dimensional cube (so that computations may be performed), and further pre-configured to not respond to requests issued by other parties, such as those originating from customers of the n-dimensional cube. This computing node might be allocated data required for computation but not viewable by users. Another computing node, not so configured, could host data that is viewable by users.

Figure 1B:
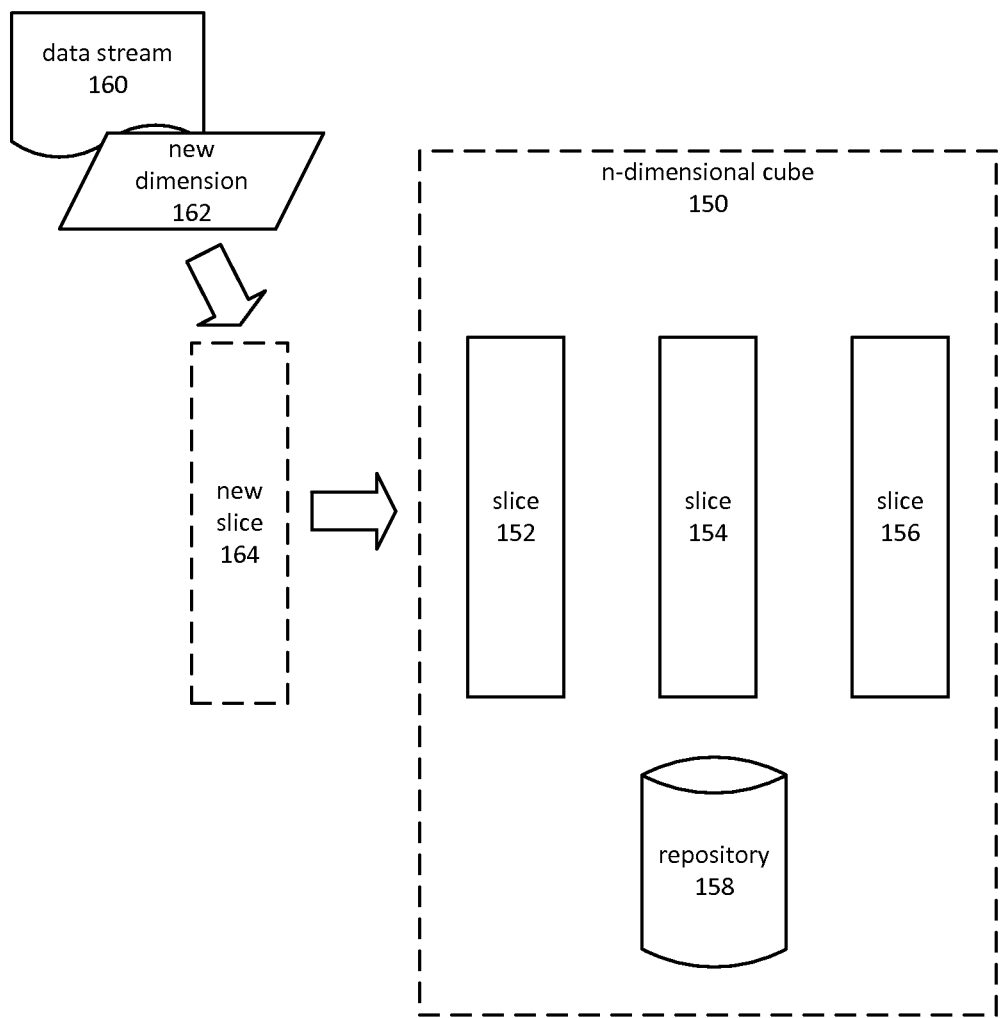
FIG. 1B is a block diagram depicting the operation of an embodiment of a system for maintaining an n-dimensional cube usable in connection with cloud-based analytics, the operation pertaining to the addition of a new dimension observed in a real-time data stream.

FIG. 1B is a block diagram depicting the operation of an embodiment of a system for maintaining an n-dimensional cube usable in connection with cloud-based analytics, the operation pertaining to the addition of a new dimension observed in a real-time data stream. A data stream 160 may comprise transactional data, real-time data, log information, and so forth. Data arriving in data stream 160 may include attributes and dimensions not included in n-dimensional cube 150 prior to the arrival of the data.

Embodiments may respond to arrival of a new dimension 162 by enabling analytics reflective of new dimension 162 without performing destructive operations on the existing n-dimensional cube. Prior art embodiments of an n-dimensional cube may be unable to incorporate a new dimension without performing substantial recomputations of existing data points within the n-dimensional cubes, such as aggregates at each intersection, or various derived values.

As depicted in FIG. 1B, an n-dimensional cube 150 may comprise slices 152-156, where each slice is fixed to a subset of the dimensions of the n-dimensional cube and variable over the remaining dimensions. A repository 158 may maintain information concerning slices 152-156, such as location, time of last refresh, dependency information, and so forth.

A new slice 164 may be added to n-dimensional cube 150 in response to the arrival of new dimension 162 through data stream 160. New slice 164 may vary in one or more dimensions that includes new dimension 162. Entries descriptive of new slice 164 may be added to repository 158. Existing slices 152-156 may remain in use without substantial recomputation occurring prior to the use of those slices. Embodiments may add information indicative of new slice 164 to repository 158. Embodiments may also add information indicative of dependency relationships between data in new slice 164 and existing slices 152-156. The dependency information may comprise a dependency graph of data maintained in the slices. The dependency graph may be indicative of dependencies between slices, dimensions, slice regions, data points, and so on. Embodiments may also add, to repository 158, information indicative of a calculation priority for a slice, a slice region, a data point within a slice, and so on. Priority may be based on a variety of factors, including an estimated likelihood of interest in the data point, the degree to which other data is dependent on the calculation, and so forth.

Figure 2A:
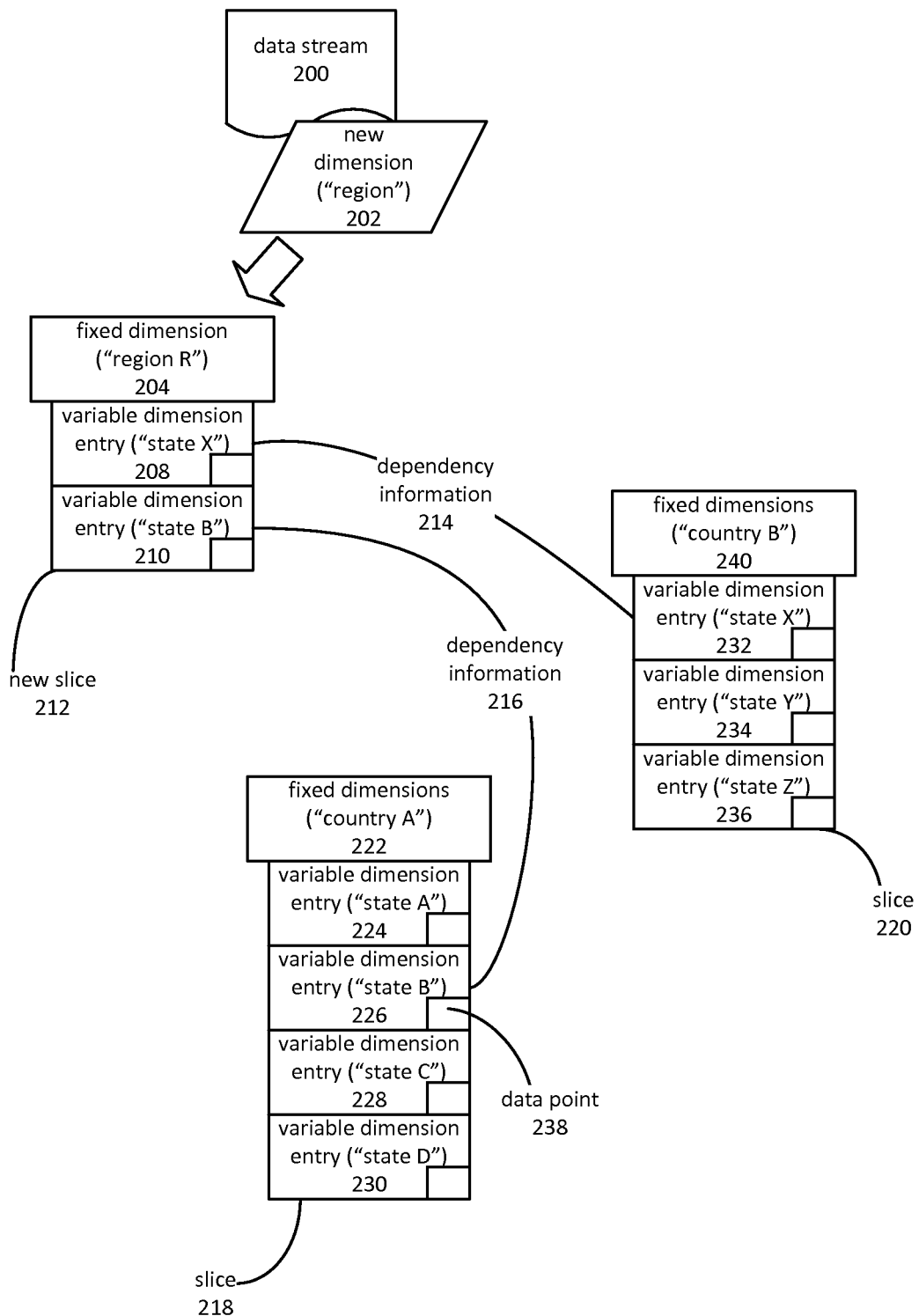
FIG. 2A is a block diagram depicting the operation of an embodiment of a system for performing cloud-based analytics, the operation involving maintenance of a dependency graph upon the addition of a new dimension to an n-dimensional cube.

FIG. 2A is a block diagram depicting the operation of an embodiment of a system for performing cloud-based analytics, the operation involving maintenance of a dependency graph upon the addition of a new dimension to an n-dimensional cube. FIG. 2A depicts an example involving of an n-dimensional cube initially containing a country dimension and a state dimension. One or more measures or other values or attributes may be associated at each intersection of these dimensions. Slice 218 may be fixed in to "A" in the country dimension, as indicated by fixed dimensions ("country A") 222. Slice 218 may further contain one or more entries along a non-fixed dimension, as depicted in FIG. 2A by variable dimension entries 224-230. Various data points may be associated with dimension entries 224-230. For example, variable dimension entry 226 may be associated with data point 238. A data point 238 may represent various measures, such as total sales in "state B" of "country A." Although only data point 238 is specifically called out in FIG. 2A, each of the other variable dimension entries 224,228, and 230 may have similar data points. Similarly, slice 220 may be fixed to country "B" in the country dimension, as indicated by fixed dimensions ("country B") 240, and may have variable dimension entries 232-236, each of which may have associated data points.

Embodiments may process a data stream 200 to incorporate new data into an n-dimensional cube. Incoming data may be related to existing dimensions and may be incorporated by marking relevant slices, slice regions, data points, and so forth as out-of-date or stale. A data dictionary may be used to maintain staleness data for the various slices, slice regions, and data points. Embodiments may also determine, through processing of data stream 200, that a new dimension 202 has been encountered and may be incorporated into an n-dimensional cube. For example, FIG. 2A depicts the addition of a new dimension 202, the "region" dimension. A new slice 212 may be added to an n-dimensional cube already containing slices 218 and 220. The new slice 212 may be held constant in the region dimension to "fixed dimension ("region R") 204, and may be variable in one or more other dimensions, such as the state dimension, as depicted by variable dimension entries 208 and 210.

Embodiments may establish dependency relationships between new slice 212 and existing slices 218 and 220. For example, dependency information 214 may be indicative of a dependency of data points associated with variable dimension entry 208 on information in slice 220 or, more precisely, variable dimension entry 232. Similarly, dependency information 216 may indicate a dependency of data points associated with variable dimension entry 210 on slice 218 or variable dimension entry 226. Embodiments may utilize various levels of granularity and directionality in establishing dependency relationships. For example, dependency relationships may be formed between slices, variable dimension entries, fixed data points, and so on, and may be formed in either direction between existing slices and new slices, or between existing slices. Embodiments may utilize dependency relationships to mark slices, slice regions, data points, and so forth as stale. Embodiments may also utilize dependency relationships to locate pre-calculated aggregates or other components of calculated further aggregates, various derived values, and so forth. Note that variable dimension entries 208 and 210 may be formed in an empty or stale state, so that calculation of the relevant values may be deferred.

Figure 2B:
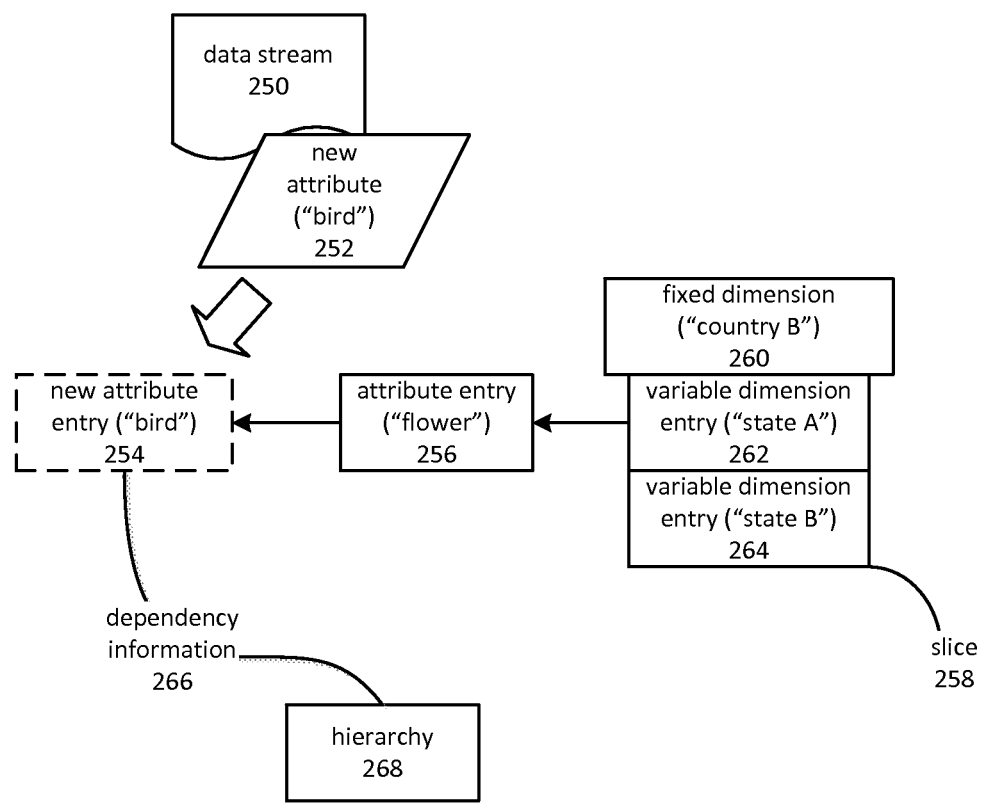
FIG. 2B is a block diagram depicting the operation of an embodiment of a system for performing cloud-based analytics, the operation involving the addition of an attribute to an n-dimensional cube.

FIG. 2B is a block diagram depicting the operation of an embodiment of a system for performing cloud-based analytics, the operation involving the addition of an attribute to an n-dimensional cube. Embodiments may process a data stream 250 and determine the presence of a new attribute associated with an existing element of a slice 258, slice 258 being associated with fixed dimension ("country B") 260 and variable dimension entries 262-264. An attribute may, at a conceptual level, be considered a value associated with an intersection of dimensions in an n-dimensional cube. Embodiments may store attributes using the mechanism depicted in FIG. 2B, in which slice entries are associated via a linked list or other structure with one or more attributes, such as attribute entry 256. Upon detecting a new attribute 252 associated with "state A," embodiments may locate a variable dimension entry ("state A") 262 and add the new attribute 254 to the list of associated attributes. Embodiments may repeat this operation multiple times for additional slices and fixed dimension entries with which the attribute would be associated.

Dependency information may be identified and stored for attributes. For example, FIG. 2B depicts dependency information 266. The depicted dependency information 266 may indicate a dependency relationship between a new attribute entry 254 and a hierarchy 268. Dependency relationships may also be maintained between existing attributes and hierarchies.

Hierarchies and various derived or calculated values may be dependent on various attribute values or attribute types. For example, a hierarchy might comprise aggregated values for sales of a product, filtered by an attribute such as color. A change to the value of an attribute might require recomputation of the hierarchy. Accordingly, there may be a dependency relationship between a product color attribute and a hierarchy. Similar relationships may exist for other derived or calculated values. Newly added attributes may also have relationships with hierarchies. One example may occur when a newly added attribute is similar in nature, or is of the same class, as an existing attribute. Where the existing attribute is a constituent of an existing hierarchy, the new attribute might be made a constituent of a new hierarchy that parallels the existing one. Rather than immediately calculating the new hierarchy, dependency information might be stored to indicate the relationship between the new attribute and the new hierarchy, which may in turn allow for deferred or on-demand computation of the new hierarchy.

Figure 2C:
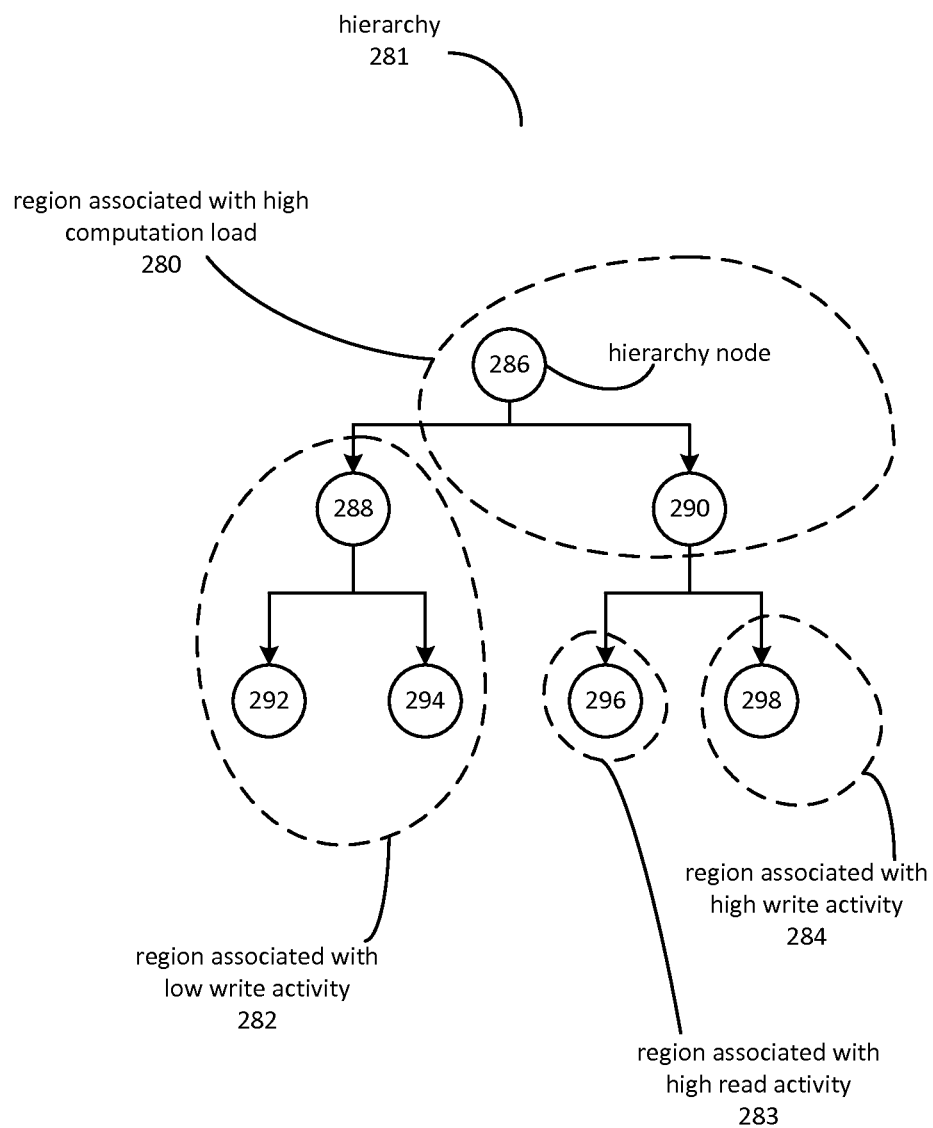
FIG. 2C is a diagram depicting an embodiment of a scalable storage mechanism for hierarchy data contained within a slice.

FIG. 2C is a diagram depicting an embodiment of a scalable storage mechanism for hierarchy data contained within a slice. In some cases and embodiments, partitioning of an n-dimensional cube may be between slices, so that each slice of data may be maintained on a separate computing node. Scalability in some cases may be achieved by performing replication and load balancing between slices. In other embodiments, partitioning may be done within a slice, instead of or in addition to slice-based partitioning.

In some embodiments, a hierarchy of data points contained within a slice may be subdivided by region and stored on a number of computing nodes. A region of a hierarchy of data points may be referred to as a subset of the hierarchy. A scaling mechanism may be selected for each region (or subset) of the hierarchy based on computational demand associated with a data point or data points contained within the region.

A slice of an n-dimensional cube may comprise various hierarchies of dimension data. For example, a slice may comprise sales data aggregated by time. For illustrative purposes, FIG. 2C will be described relative to a time dimension and a sales dimension. It will be appreciated, however, that the use of time and sales to illustrate the various aspects of FIG. 2C should not be viewed as limiting the scope of the present disclosure.

In FIG. 2C, a hierarchy 281 may comprise hierarchy nodes 286-298. Each node in the hierarchy may be a stored representation of a sum of values. Using the time and sales dimensions as an example, hierarchy nodes 292, 294, 296, and 298 might each contain a sum of the sales figures for a six-hour period of time. Hierarchy nodes 288 and 290 might each contain an aggregate of six-hour figures. For example, hierarchy node 288 might represent a twelve-hour period and contain an aggregate of the values associated with hierarchy nodes 292 and 294. Similar, hierarchy node 290 might represent a second twelve-hour period, and contain an aggregate of the values associated with hierarchy nodes 296 and 298. Hierarchy node 286 might contain an aggregate for a 24-hour period that includes hierarchy nodes 288 and 290. Embodiments may infer, from the inclusion of a time dimension in the hierarchy, that more current time periods are more likely to involve frequent writes. Embodiments may utilize a mapping from the time dimension to a predicted level of updates, thereby estimating the computational demands likely to be involved in maintained data points within a region of the hierarchy.

Scalability of an n-dimensional cube may be increased using a tree-based storage mechanism. In an embodiment, a tree-based storage mechanism may parallel a hierarchy tree, such as hierarchy 281 in FIG. 2C. Updates to the hierarchy may, in some embodiments, proceed as follows: 1) new data may be stored in a leaf node, and any aggregate values in the leaf adjusted; 2) an aggregate value of a parent of the leaf node may be adjusted; and 3) an aggregate value of the parent of the parent of the leaf node may be adjusted, and so on.

Using time and sales as an example, a node representing the current time period may be updated frequently. This may in turn cause its ancestors in the n-dimensional cube to be updated frequently, as adjustments to aggregate values flow up through the chain of inheritance. For example, hierarchy node 298 may represent a current six-hour window. As sales data for the current window is collected, the value associated with hierarchy node 298 may be frequently adjusted. This in turn might cause hierarchy nodes 290 and 286 to be adjusted. Some embodiments may defer aggregate calculations at various levels of the hierarchy.

A scaling mechanism for the hierarchy data may be based on a classification of regions in the hierarchy. The classification may include factors such as the computational demands imposed upon a computing node that hosts some or all of a hierarchy. Classifications may include the frequency of activity and the type of activity. For example, a region associated with high write activity 284 might be associated with hierarchy node 298, though of course more than one hierarchy node might, in various cases and embodiments, be classified in this manner. The high number of writes might be the result of the type of data contained in the hierarchy, such as hierarchy node 298 containing data from the current time period. Another region of hierarchy 281 might be classified as being a region associated with high computation load 280. This region 280 might be associated with greater demands associated with calculating aggregate values. For example, if hierarchy node 298 is being updated to include additional data, its ancestor nodes 290 and 286 might be involved in relatively frequent recalculation of aggregates or other derived values. Another classification might identify a region associated with low write activity 282. Further classifications might involve regions implicated in frequent query and retrieval operations, such as a region associated with high read activity 283. Classifications may also involve those regions with relatively little activity.

A scaling mechanism for maintaining hierarchies may be based on one or more of the aforementioned classifications of computational demand. In an embodiment, hierarchy nodes in a region associated with a high computation load 280 may be partitioned by further subdividing computations associated with nodes in the region. For example, calculations related to hierarchy node 286 might be performed on a computing node separate from those related to hierarchy node 290. The calculations related to hierarchy node 286 might be further partitioned among a number of computing nodes. For example, computations related to the branch of the hierarchy beginning with hierarchy node 288 might be performed on a computing node separate from those related to the branch beginning with hierarchy node 290.

Hierarchy nodes in regions associated with high write activity may be horizontally partitioned to distribute write load across multiple computing nodes. For regions with low write activity, but high read activity, replication may be used to distribute read load across multiple computing nodes.

Embodiments may also emphasize use of certain resource types based on the aforementioned classifications. For example, a computing node maintaining a hierarchy associated with frequent computations or writes may maintain data in-memory, while those associated with low activity may utilize conventional storage.

In various cases and embodiments, a region of a hierarchy may consist of a path through the hierarchy. For example, a region might consist of a first node, the parent of the first node, and so on. A path in the hierarchy may be maintained in main system memory, or on another relatively low-latency storage device, while the frequency with which data in the path is accessed. A write operation performed on a lower-level node in the path may trigger cascading updates. Embodiments may maintain the parents of frequently written nodes in main system memory in order to efficiently process these and similar types of updates. When access frequency, particularly write frequency, is above a threshold level, the path may be maintained in main memory. When access frequency falls below a certain level, the path may be maintained on a device with comparatively high latency.

In various embodiments, regions of a hierarchy may be mapped to computing nodes based on a classification of the computing nodes. A hierarchy may be hosted on a number of computing nodes with potentially variable configurations. Some of the computing nodes, for example, might be configured as calculation-intensive nodes, which may indicate that the computing node is configured to offer improved efficiency in performing calculations. Other computing nodes might be configured so as to offer improved efficiency with respect to storing data.

Figure 3A:
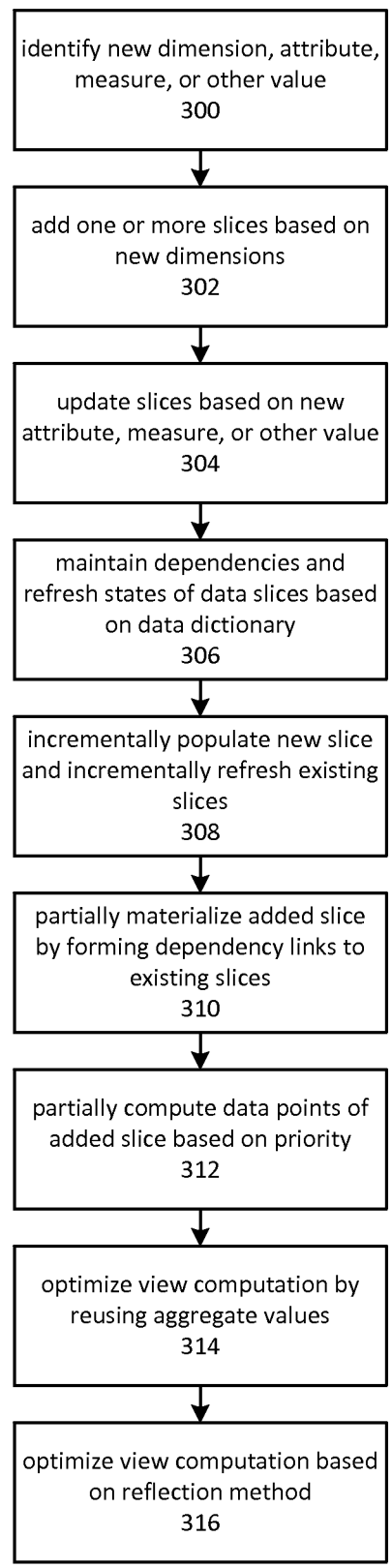
FIG. 3A is a flowchart depicting an embodiment of a process for maintaining an n-dimensional cube adapted for cloud-based analytics.

FIG. 3A is a flowchart depicting an embodiment of a process for maintaining an n-dimensional cube adapted for cloud-based analytics. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 300 depicts identifying a new dimension, attribute, measure, or other value that may be incorporated into an n-dimensional cube. Embodiments may process a data stream for new data that is indicative of adding a new dimension, attribute, measure, or other value. A data stream may correspond to a real-time data source, log file, or other data source typically associated with a continuous or semi-continuous stream of data. These data sources may generally be described as providing data on an incremental basis.

A data stream may also be associated with historical data, transactional data, and the like, which may be updated or incorporated into an n-dimensional cube periodically, rather than on a continuous basis. This type of data source may generally be described as providing bulk load data.

A process for identifying new data for incorporation into an n-dimensional cube may operate similarly for both incrementally loaded and bulk-load data. Operation 302 depicts adding new slices to an n-dimensional cube based on the newly discovered dimension. With reference to FIG. 1A, addition of a new slice may involve assigning a partition to host the slice, such as partition 110 in FIG. 1A, replicating the slice to a replica, such as replica 114, and updating repository 108. In various embodiments, the analytics incorporating the new dimension may be performed prior to these steps being completed.

Operation 304 depicts updating one or more slices based on a new attribute, measure, or other value identified in data incoming from a data stream. Embodiments may update slice data maintained on a partition and trigger replication of the data.

Embodiments may also cause the data dictionary to be updated to reflect the presence of the updated data, including marking slices, slice regions, and data points as stale, if they would be rendered out-of-date due to the newly arrived data. Operation 306 depicts maintaining dependency information and refresh states of slices, slice regions, and data points. Embodiments may employ different levels of granularity with respect to dependency information. An embodiment, for example, might maintain a course granularity at the data slice level only.

Operation 308 depicts incrementally populating the newly added slice and incrementally refreshing the existing slices. Embodiments may add a new slice upon discovering the existence of a new dimension, at which time a relatively small amount of relevant data—as few as one or even zero data points—may be available. Accordingly, a slice may be created in an essentially empty state and populated as data relevant to the slice arrives through a data stream.

As depicted by operation 310, various embodiments may partially materialize views in the newly added slice by forming dependency links from the new slice, or from slice regions or data points within the new slice, to existing slices, slice regions, or data points. The new slice may be considered partially materialized because the availability of the links may allow for responsive calculations of data points within the new slice when it is needed.

As depicted by operation 312, embodiments may partially compute data points in the added slice based on a priority for calculation. Embodiments may utilize various factors to determine priority. In an embodiment, user interest may be estimated by various factors to determine the priority of a calculation. User interest may be estimated, for example, by monitoring mouse movement, such as hovering over a data point. A client application may monitor mouse movements and transmit corresponding information to a cloud-based analytics platform. The information may indicate a region of slice data that the user was hovering over using the mouse, which might be indicative of a desire to drill-down into the data. Embodiments may then trigger calculation of data needed for the drill-down. An embodiment may also estimate interest by categorizing the data to be prioritized and correlating the category to an estimated level of interest for each category. A variety of additional techniques may be employed to determine priority, such as the degree of dependency with other data.

Operation 314 depicts optimizing computation of a slice by reusing aggregate data. Calculation of various data points within a slice may involve aggregate values that may be combined to form aggregates of a greater number of values, or split to form aggregates of a smaller number of values. Embodiments may maintain dependency graph information to use in conjunction with aggregate reuse.

Operation 316 depicts optimizing slice computations based on a reflection. Here, the term reflection may refer to a technique involving processing an n-dimensional cube matrix (which may be projected onto one or more slices) on a diagonal axis formed between related dimensions, and using completed computations on one half of the diagonal to complete computations on the other half. For example, calculations involving models-years-sales may be reused to perform calculations involving years-models-sales. This technique may be applied in response to there being a single key performance indicator (such as sales) spread across a distribution of attributes whose number is above a threshold value.

In various embodiments, a new dimension may be added to an n-dimensional cube. A new dimension may be added in response to various events or conditions, such as receiving a request to add a new dimension, receiving data from a data stream that corresponds to a dimension not already represented in the n-dimensional cube, and so on. Embodiments may add the new dimension by forming a data slice and adding it to a plurality of additional data slices that may make up an n-dimensional cube. Information describing the new data slice, which may include information about a computing node on which the slice is hosted, may be added to a repository containing information about the n-dimensional cube. The repository may comprise inter-slice dependency information.

A data slice may comprise a plurality of data points corresponding to intersections of the new dimension and one or more other dimensions already represented in the n-dimensional cube. Values, such as aggregates and other derived values, may be associated with a data point.

Forming the new data slice may comprise partially materializing a hierarchy of data points in the n-dimensional cube. A partially materialized hierarchy may comprise calculating zero or more of the values associated with data points in the hierarchy. Calculation of these data points may be deferred until they are needed. Instead of pre-calculating each of the data points, embodiments may pre-calculate dependency information for the data points. For example, a value associated with a first data point may be used to calculate a value associated with a second data point. Embodiments may identify this dependency upon addition of the new dimension to the n-dimensional cube, and also store information describing the dependency. The information describing the dependency may be stored within a data slice, or externally in a repository. In some cases, there may be inter-slice dependencies. In such cases, embodiments may store the dependency information in a central repository, rather than on a computing node hosting the data slice.

Embodiments may calculate a value associated with a data point based on a determined priority. A priority for calculation may indicate a relative order for calculating a value associated with a data point, and may also indicate that a value should not be computed unless or until it is needed to respond to a request to read the value.

Embodiments may adjust the priority of deferred calculations based on various factors. This may include immediately performing a calculation. Embodiments may adjust priority on factors that include, but are not limited to, user actions, previous access patterns on the same data or on similar data, such as data in hierarchies that may be conceptually similar to the hierarchy containing a data point to be calculated, and so on. For example, embodiments may determine that certain types of drill-down, drill-up, or pivot operations are commonly performed and highly prioritize or immediately perform the related calculations.

Another factor that may be utilized to determine the priority of calculations is security. Embodiments may, for example, determine a priority for calculating a data point based on various security attributes, such as those associated with dimensions, hierarchies, or an n-dimensional cube.

Embodiments may determine to calculate or otherwise compute data points based on sorting values indicative of the determined priority for calculation. For example, embodiments may assign a priority score to a data point (or to a region of a slice or hierarchy associated with a data point), and sort the data points accordingly. Various techniques may be employed to create a compact, sortable structure that is representative of priority values associated with data points.

Embodiments may employ dependency information to identify a path in a hierarchy of data points that may need recalculation following a change to a value at the base of the path. For example, when a value at the base of a hierarchy is updated, its ancestors may require recalculation. Embodiments may identify a path between a data point associated with a changed value and an ancestor, and mark data points along that path as being out-of-date with respect to the descendent. Calculation of the ancestor data point may then be prioritized using the various techniques disclosed herein.

In some cases, a data point may be dependent on an incomplete set of data. For example, an aggregate value for a current 24-hour period may be incomplete until that 24-hour period has elapsed. Embodiments may track data points associated with incomplete data sets and adjust computation priorities based at least partly on when the data set may be considered complete. For example, ancestors of a data point that is dependent on an incomplete data set may be marked as low priority for recomputation while the dataset is incomplete. The priority may then be adjusted upwards when the dataset becomes complete.

In an embodiment, a data point may be computed based on extrapolating a value associated with a descendent of the data point to be computed. For example, an aggregate value for the current week's sales figures might be incomplete prior to the last day of the week. However, a value for the missing data points may be extrapolated based, for example, on the corresponding days in prior weeks.

Figure 3B:
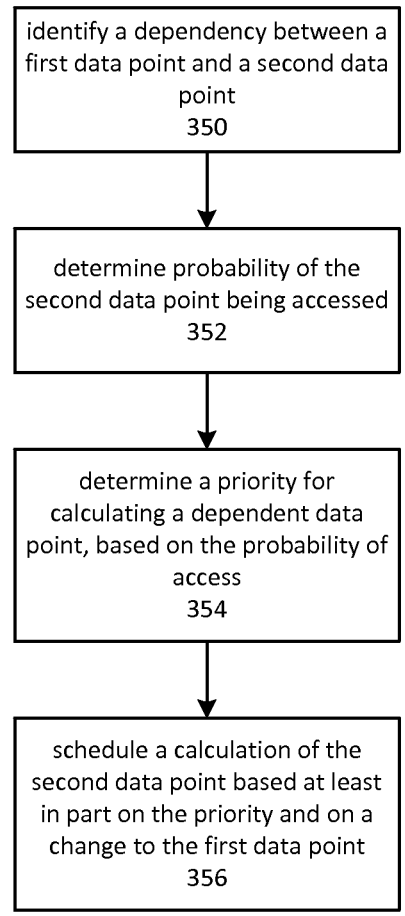
FIG. 3B is a flowchart depicting an embodiment of a process for deferring computation of data points in an n-dimensional cube.

FIG. 3B is a flowchart depicting an embodiment of a process for deferring computation of data points in an n-dimensional cube. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 350 depicts an embodiment identifying a dependency between a first data point and a second data point. The dependency may reflect a relationship between the two values, such as the first data point serving as input into a calculation used to derive a value for the second data point. When the first data point changes, the second data point may need to be recalculated in order to remain accurate. Embodiments may, however, defer calculation of the second data point and schedule calculation using various techniques and mechanisms, as presented herein.

Operation 352 depicts determining a probability that the second data point will be accessed. Access of the data point may involve its use in a computation related to another data point. Probability of access for this purpose may be calculated, by various embodiments, using a dependency graph or similar structure. A variety of other factors may be utilized by various embodiments to determine a probability that the second data point will be accessed. Operation 354 depicts determining a priority for calculating a dependent data point, based on the probability of access. Operation 356 depicts scheduling a calculation of the second data point based at least in part on the priority and on a change to the first data point.

In an embodiment, a probability that the second data point may be accessed may be determined based at least partly on receiving information indicative of a user interaction with an interface that is indicative or suggestive of a present or future drill-down, drill-up, or pivot operation. In more general terms, a user may interact with a user interface in a manner that indicates an increased probability, or a certainty, that a data point will be accessed. These actions may include mouse hovering over a data field, clicking on or hovering over a button that indicates that a drill-down, drill-up, or pivot should be performed, and so on.

Embodiments may also consider the data that has been transmitted to a client application for display to a user. For example, if data at level "N" of a hierarchy is on display in a client application, the data points at levels "N−1" and "N+1" may have an increased likelihood of access.

Embodiments may utilize comparisons of the cost of calculating a data point with the time that may elapse in calculating a data point. In some cases, a customer of a hosted data analytics service may indicate a preference for performance over cost. In such a case, an embodiment might aggressively prioritize computations so as to minimize delay. In other cases, a customer may wish to reduce the cost of utilize a data analytics service, and may indicate a preference for cost savings. The cost savings may be achieved, in some instances, as a trade off with decreased performance that might result from deferring computations.

Embodiments may utilize access patterns for an n-dimensional cube or for a transactional data source related to an n-dimensional cube. For example, previous queries performed against an n-dimensional cube or against a transaction data source may be indicative of certain aggregations or other values having greater significance than others. Data points related to such aggregations or other values may have an increased likelihood of being accessed. These data points may, accordingly, be assigned a higher priority for calculation than other data points.

Figure 4:
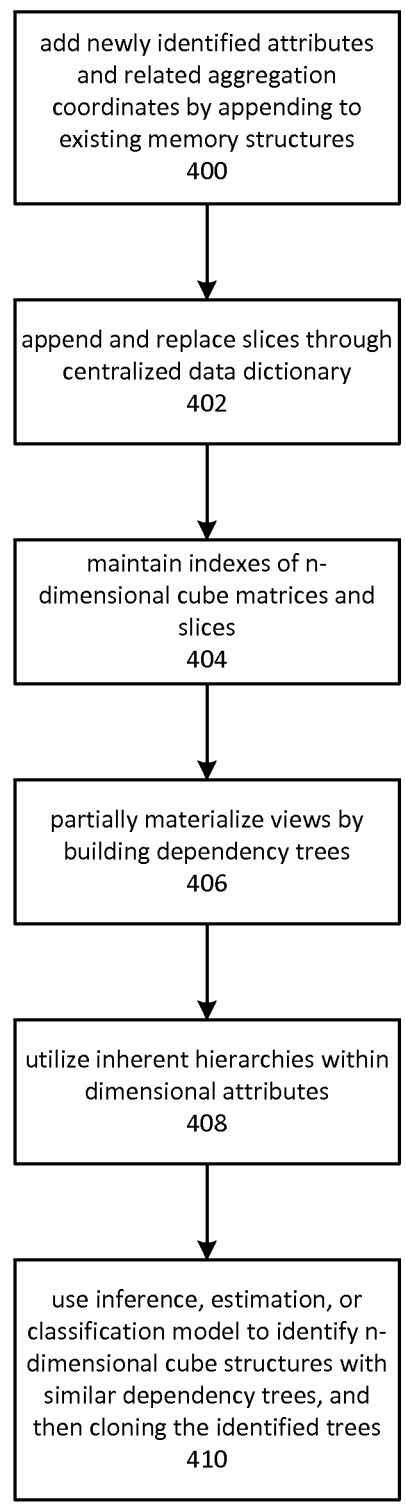
FIG. 4 is a flowchart depicting an embodiment of a process for performing deferred computations in an n-dimensional cube adapted for cloud-based analytics.

FIG. 4 is a flowchart depicting an embodiment of a process for performing deferred computations in an n-dimensional cube adapted for cloud-based analytics. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Embodiments may, as depicted by operation 400, add newly identified attributes and related aggregation coordinates to an n-dimensional cube by appending data to existing memory structures. Embodiments may maintain slice data structures in system memory, such as random-access memory ("RAM"). Embodiments may further maintain copies of slice data structures on a backing partition, which may be replicated to additional partitions.

In various embodiments, new dimensions may be made to be auto-discoverable by an end user. Embodiments may transmit information indicative of a new dimension to a client device operating an embeddable analytics module, which may display an indication of the new dimension to an end user. The user's reaction to the new dimension, such as mouse movements or mouse clicks, may be used to gauge the user's interest in the new dimension and to adjust priorities for computing data points in the n-dimensional cube.

As depicted by operation 402, embodiments may append and replace slices through a centralized data dictionary. A data dictionary may comprise one or more tables in a database management system. The data dictionary may be partitioned and replicated for the purpose of providing improved load balancing capabilities and increased reliability. As depicted by operation 404, embodiments may maintain various index structures indicative of regions of the n-dimensional cube, which may be referred to by the term matrix or matrices. Embodiments may also maintain index structures for slices, slice regions, and data points.

Embodiments may partially materialize views of the n-dimensional cube by building dependency trees, as depicted by operation 406. Building dependency trees may be performed instead of directly calculating data points at each coordinate intersection in an n-dimensional cube. Various techniques may be employed to build dependency trees, such as those depicted by operations 408 and 410.

Operation 408 depicts utilizing inherent hierarchies within dimensional attributes to build a dependency tree. Embodiments may calculate aggregates at the finest grain with higher priority than aggregates at the coarsest grain. The fine-grained aggregates may then be projected to form the course-grained aggregates. Embodiments may defer calculation of the course-grained aggregates until needed, such as in response to an indication of user interest.

Operation 410 depicts using inference, estimate, classification models, and other similar techniques to identify n-dimensional cube structures to which similar dependency trees should apply. A new dimension, measure, or attribute may have similarity with existing dimensionality such that its dependency models may be cloned, with or without further alteration. Embodiments may, in some cases, be able to identify unique correspondence between new attributes. For example, a new store may have the same data dependencies as existing stores. Where a unique correspondence is not found, the closest neighbor may be found using techniques, such as classification. A dependency tree of the closest neighbor may then be found and adjusted as needed for application to the new dimension, measure, or attribute.

Classification and inference techniques may be applied to access patterns of the n-dimensional cube in order to identify n-dimensional cube structures that should be cloned. For example, users of an n-dimensional cube may be classified into groups. The access patterns of users within a group may be analyzed, for example by determining which n-dimensional cube structures are accessed most frequently, identifying typical drill-down depths, identifying common pivots, and so on. When constructing n-dimensional cube structures for a new user who falls within the same group, this information may be reflected in various aspects of the new n-dimensional cube structure, such as computation priorities.

Figure 5A:
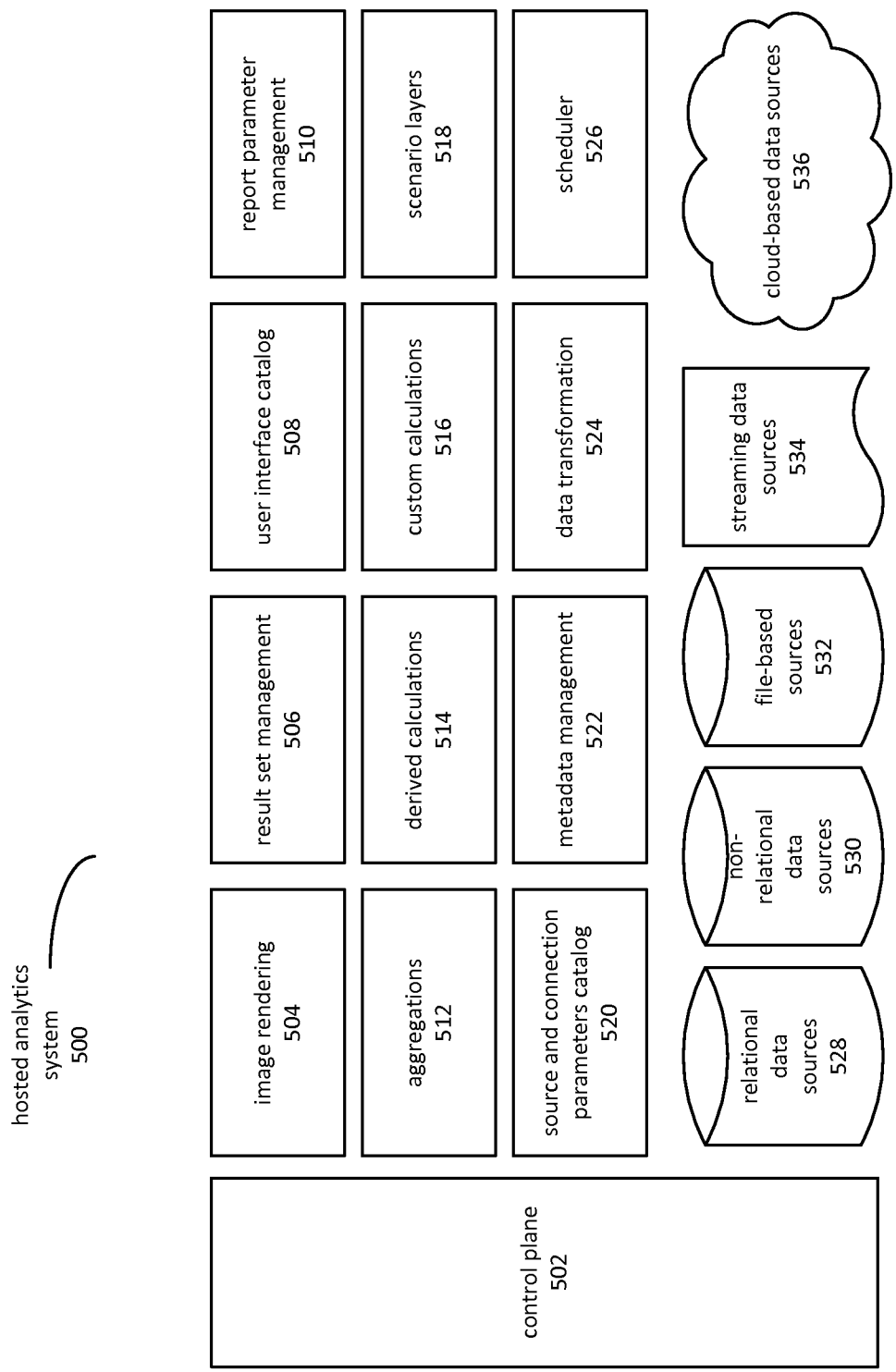
FIG. 5A is a block diagram depicting an embodiment of a system for providing hosted analytics services.

FIG. 5A is a block diagram depicting an embodiment of a system for providing hosted analytics services. A hosted analytics system 500 may be managed by a control plane 502 that coordinates activities of various modules of the system.

An image rendering 504 module may provide rendering services for embedded user-interface components, such as graphs and charts. A result set management 506 module may maintain history information, data caches, and so forth pertaining to results of performing an analysis. A user interface catalog 508 module may maintain a repository of user interface elements for embedded analytics, such as images and so forth, that might be inserted in the user interface of an application that includes embedded analytics features. A report parameter management 510 module may comprise a repository of parameters to be used in generating analytical reports, such as time periods, geographic region, dimensions to include in a report, desired drill-down levels, and so on.

An aggregations 512 module may perform operations to calculate aggregate values in various dimensions and combinations of dimensions. For example, aggregations 512 module may calculate monthly, weekly, and daily sales data for a particular store, geographic region, and state.

A derived calculations 514 module may perform second-order calculations based on aggregate data and other information. A custom calculations 516 module may perform report-specific or user-provided calculations. Custom calculations may be provided, for example, by an application publisher.

A scenario layers 518 module may perform operations related to simulations, projections, or other types of "what-if" scenarios. These may be custom scenarios provided, for example, by an application publisher.

A source and connection parameters catalog 520 may maintain information used to locate and connect to various information sources. Information for locating sources may include network address, uniform resource locators ("URLs"), and so forth. Information for connecting may include various forms of credentials, accounts, user names, and so forth.

A metadata management 522 module may maintain various forms of metadata and other information used in interfacing with various data sources, such as relational data sources 528, non-relational data sources 530, file-based sources 532, streaming sources 534, and cloud-based data sources 536. Embodiments may employ metadata from metadata management 522 module in conjunction with data transformation 524 module. Data transformation 524 module may perform data transformation and data cleansing operations on incoming data.

A scheduler 526 module may coordinate the timing of various activities performed by hosted analytics system 500. The coordination may involve scheduling n-dimensional cube rebuilding, scheduling data retrieval, and so forth.

Various data sources may be employed. These include relation data sources 528, such as SQL-based relational database management systems, as well as non-relational data sources 530. Various non-relational data sources 530 may include NoSQL database systems, key-value pair databases, object-relational databases, and so forth. Various file-based sources 532 may be used, such as document repositories, log files, and so forth. Log files may also be treated as streaming data sources 534, which may also include other types of data sources where data may be updated on an ongoing basis. Another example that may be categorized with other streaming data sources 534 is data generated from videogames, such as multi-player video games.

Various types of cloud-based data sources 536 may be used. These may include various web sites or data sources maintained by a provider of hosted analytics services, an application publisher, a user of an application, or a third party.

Figure 5B:
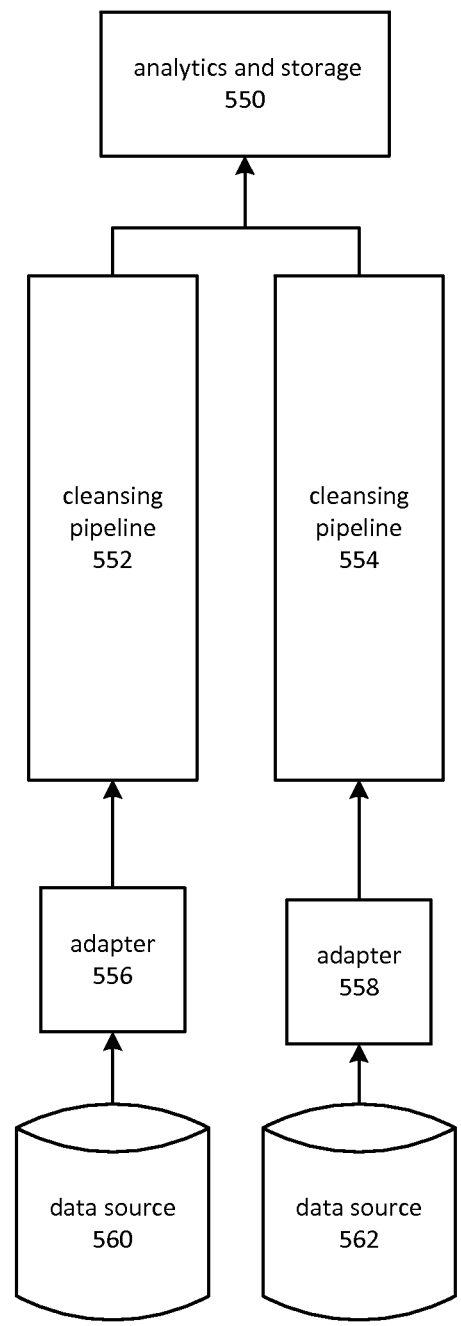
FIG. 5B depicts a process for intake and processing of data from real-time data sources.

FIG. 5B depicts a process for the intake and processing of data from real-time data sources. A data source 560 may be communicatively coupled to an adapter 556 and a cleansing pipeline 552. Additional data sources, such as data source 562, may be communicatively coupled to other adapters and pipelines, such as adapter 558 and cleansing pipeline 554.

An adapter 556 may transform data from data source 560 to a format suitable for processing by cleansing pipeline 552. Operations performed by cleansing pipeline 552 may include performing one or more translations or transformations on incoming data. Examples include stemming, lemmatisation, and so forth. A cleansing pipeline 552 may be multiplexing. This may include performing cleansing along multiple paths in order to produce data in a normalized format that matches a normalized format used in each destination n-dimensional cube.

FIG. 5B depicts an analytics and storage 550 module. This may refer to various components for performing analytics, such as modules 502-526 in FIG. 5A. Cleansed data incoming from cleansing pipelines 552 and 554 might be processed by an analytics and storage 550 module. The processing might include operations, such as performing aggregation, performing custom calculations, scenario modeling, and so forth. Data from cleansing pipelines 552 and 554, as well as any calculated or derived values, may be routed and stored in an appropriate n-dimensional cube.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
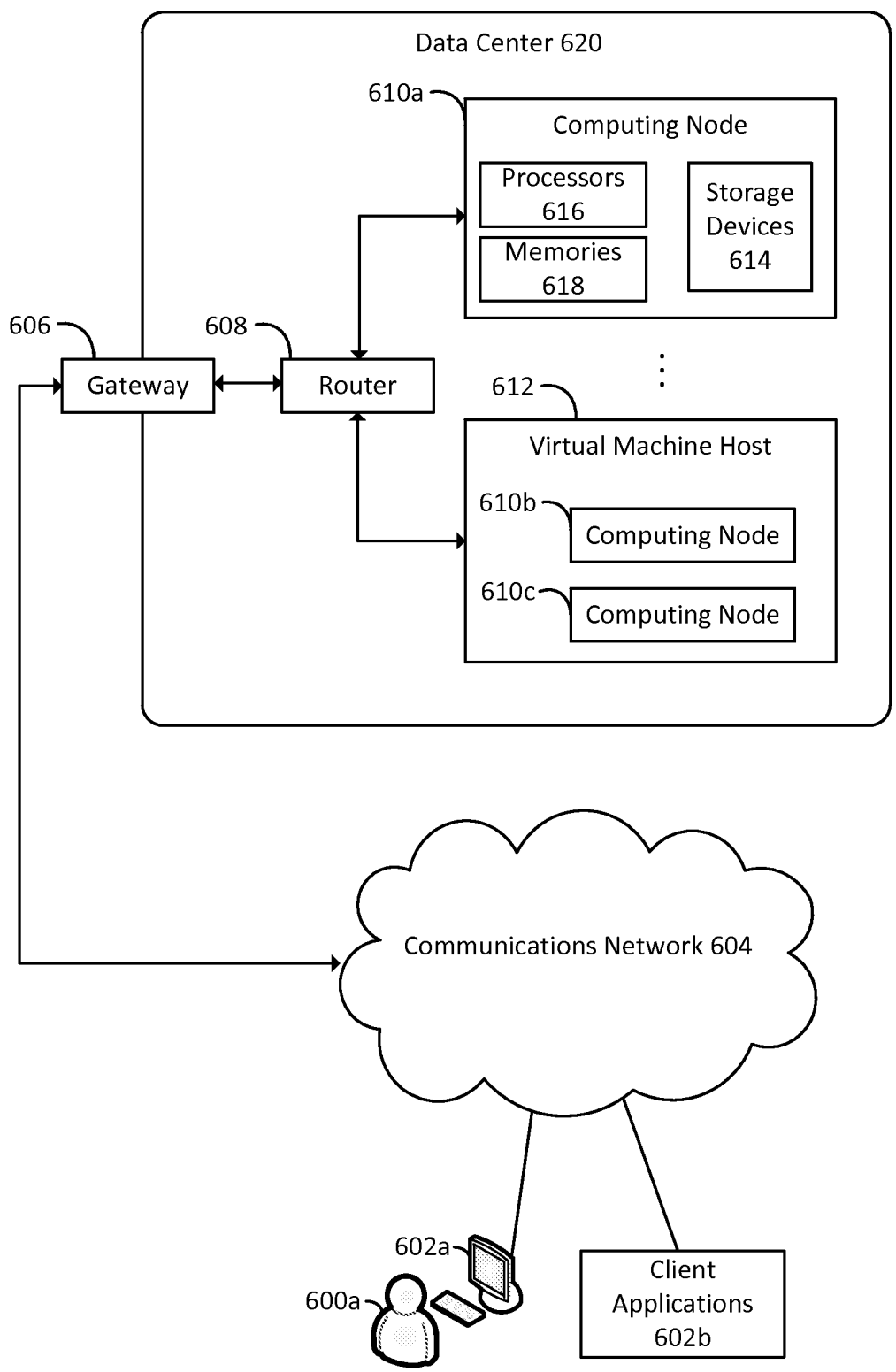
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
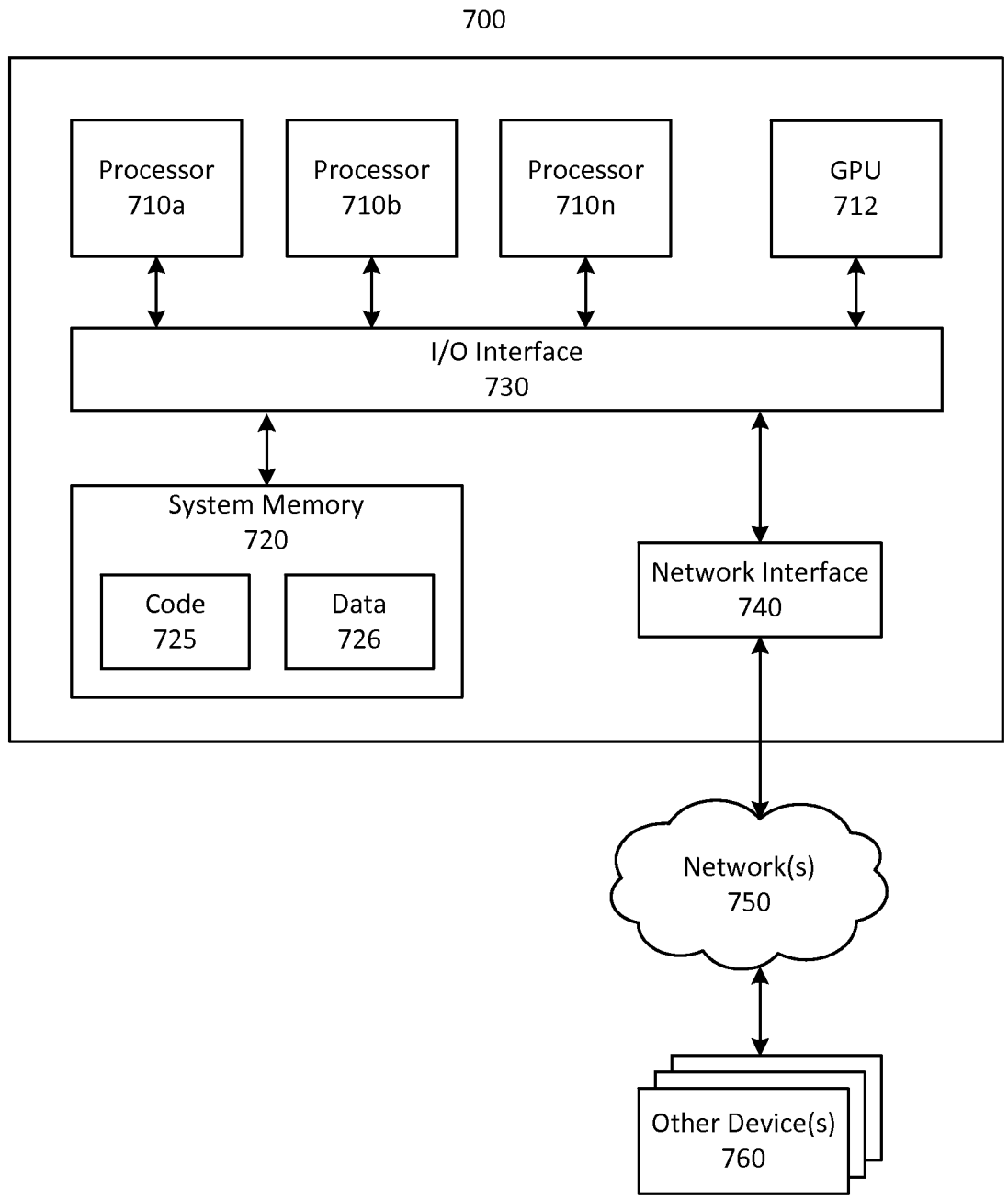
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/ output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
one or more memories having stored thereon computer-readable instructions that, upon execution by a computing device, cause the system at least to:
identify a dependency between a first data point of a plurality of data points and a second data point of the plurality of data points in response to an addition of a new dimension to an n-dimensional cube, the dependency comprising calculation of the second data point based on the first data point;
determine a priority for calculating the second data point, the priority based at least in part on information indicative of a chance of receiving a request to access the second data point;
schedule a calculation of the second data point based at least in part on the priority and on information indicative of a change to the first data point received via a real-time stream of data;
add a new slice to the n-dimensional cube, wherein the new slice includes a fixed dimension that corresponds to the added dimension, and one or more variable dimensions; and
store the second data point based on the scheduled calculation.

2. The system of claim 1, further comprising one or more memories having stored thereon computer-readable instructions that, upon execution by the computing device, cause the system at least to:
calculate the chance of receiving the request to access the second data point based at least in part on receiving information indicative of interaction with a user interface.

3. The system of claim 1, further comprising one or more memories having stored thereon computer-readable instructions that, upon execution by the computing device, cause the system at least to:
calculate the chance of receiving the request to access the second data point based at least in part on access patterns implied by queries executed against at least one of the n-dimensional cube comprising the plurality of data points or a transactional data source related to the n-dimensional cube.

4. The system of claim 1, further comprising one or more memories having stored thereon computer-readable instructions that, upon execution by the computing device, cause the system at least to:
calculate the chance of receiving the request to access the second data point based at least in part on a request to perform at least one of a drill-down, drill-up, or pivot.

5. The system of claim 1, further comprising one or more memories having stored thereon computer-readable instructions that, upon execution by the computing device, cause the system at least to:
determine the priority for calculating the second data point based at least in part on time elapsed while calculating the second data point.

6. A computer-implemented method, comprising:
adding a dimension to an n-dimensional cube based at least in part on a data stream, wherein a first data point is based at least in part on the added dimension;
adding a new slice to the n-dimensional cube, wherein the new slice includes a fixed dimension that corresponds to the added dimension, and one or more variable dimensions;
identifying a dependency between the first data point and a second data point in response to adding the dimension;
determining a priority for calculating the second data point, the priority based at least in part on information indicative of a chance of receiving a request to access the second data point;
scheduling a calculation of the second data point based at least in part on the priority and on a change to the first data point; and
storing the second data point based on the scheduled calculation.

7. The computer-implemented method of claim 6, further comprising:
calculating the chance of receiving the request to access the second data point based at least in part on receiving information indicative of interaction with at least one of a drill-down, drill-up, or pivot control.

8. The computer-implemented method of claim 6, further comprising:
calculating the chance of receiving the request to access the second data point based at least in part on access patterns implied by queries executed against at least one of the n-dimensional cube or a transactional data source related to the n-dimensional cube.

9. The computer-implemented method of claim 8, wherein the access pattern comprises access to an aggregate value.

10. The computer-implemented method of claim 6, further comprising:
   determining the priority for calculating the second data point based at least in part on a cost of computing the second data point.

11. The computer-implemented method of claim 6, further comprising:
   calculating the second data point based at least in part on receiving the request to access the second data point.

12. The computer-implemented method of claim 6, further comprising:
   determining that the chance of receiving the request to access the second value is increased, based at least in part on the first data point being transmitted to a computing device for display to a user.

13. A non-transitory computer-readable storage medium having stored thereon instructions that, upon execution by one or more computing devices, cause the one or more computing devices at least to:
   identify a dependency between a first data point and a second data point in response to an addition of a new dimension to an n-dimensional cube;
   add a new slice to the n-dimensional cube, wherein the new slice includes a fixed dimension that corresponds to the added dimension, and one or more variable dimensions;
   determine a priority for calculating the second data point, the priority based at least in part on information indicative of a chance of receiving a request to access the second data point;
   schedule a calculation of the second data point based at least in part on the priority and on a change to the first data point; and
   store the second data point based on the scheduled calculation.

14. The non-transitory computer-readable storage medium of claim 13, comprising further instructions that, upon execution by the one or more computing devices, cause the one or more computing devices to at least:
   calculate the chance of receiving the request to access the second data point based at least in part on receiving information indicative of performing at least one of a drill-down, drill-up, or pivot operation.

15. The non-transitory computer-readable storage medium of claim 13, comprising further instructions that, upon execution by the one or more computing devices, cause the one or more computing devices to at least:
   calculate the chance of receiving the request to access the second data point based at least in part on access patterns implied by queries executed against at least one of the n-dimensional cube comprising the first and second data points or a transactional data source related to the n-dimensional cube.

16. The non-transitory computer-readable storage medium of claim 15, wherein the access pattern includes a query processed by at least one of the n-dimensional cube or the transactional data source related to the n-dimensional cube, the query comprising an aggregation clause.

17. The non-transitory computer-readable storage medium of claim 13, comprising further instructions that, upon execution by the one or more computing devices, cause the one or more computing devices to at least:
   determine the priority for calculating the second data point based at least in part on a cost of computing the second data point.

18. The non-transitory computer-readable storage medium of claim 13, comprising further instructions that, upon execution by the one or more computing devices, cause the one or more computing devices to at least:
   calculate the second data point based at least in part on receiving the request to access the second data point.

19. The non-transitory computer-readable storage medium of claim 13, comprising further instructions that, upon execution by the one or more computing devices, cause the one or more computing devices to at least:
   determine that the chance of receiving the request to access the second data point is increased, based at least in part on the first data point being transmitted to a computing device for display to a user.

20. The non-transitory computer-readable storage medium of claim 13, comprising further instructions that, upon execution by the one or more computing devices, cause the one or more computing devices to at least:
   determine to calculate the second data point based at least in part on the priority, the priority being relative to priorities for calculating other data points of the first and second data points in an n-dimensional cube.

21. The non-transitory computer-readable storage medium of claim 13, comprising further instructions that, upon execution by the one or more computing devices, cause the one or more computing devices to at least:
   determine to calculate the second data point based at least in part on a security attribute associated with at least one of the second data point, a dimension, a hierarchy, or an n-dimensional cube comprising the first and second data points.

* * * * *